United States Patent
Ewe et al.

(10) Patent No.: US 10,935,687 B2
(45) Date of Patent: Mar. 2, 2021

(54) FORMATION IMAGING WITH ELECTRONIC BEAM STEERING

(71) Applicant: HALLIBURTON ENERGY SERVICES, INC., Houston, TX (US)

(72) Inventors: Wei-Bin Ewe, Singapore (SG); Glenn Andrew Wilson, Houston, TX (US); Burkay Donderici, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 300 days.

(21) Appl. No.: 15/544,903

(22) PCT Filed: Feb. 23, 2016

(86) PCT No.: PCT/US2016/019020
§ 371 (c)(1),
(2) Date: Jul. 20, 2017

(87) PCT Pub. No.: WO2017/146679
PCT Pub. Date: Aug. 31, 2017

(65) Prior Publication Data
US 2018/0100945 A1      Apr. 12, 2018

(51) Int. Cl.
*G01V 3/18* (2006.01)
*G01V 3/38* (2006.01)
*H01Q 3/00* (2006.01)
*H01Q 3/26* (2006.01)

(52) U.S. Cl.
CPC .......... *G01V 3/18* (2013.01); *G01V 3/38* (2013.01); *H01Q 3/00* (2013.01); *H01Q 3/2605* (2013.01)

(58) Field of Classification Search
None
See application file for complete search history.

(56) References Cited

U.S. PATENT DOCUMENTS

| 3,944,910 A | 3/1976 | Rau |
| 4,704,581 A | 11/1987 | Clark |
| 5,243,290 A | 9/1993 | Safinya et al. |

(Continued)

FOREIGN PATENT DOCUMENTS

WO   2009009342 A1   1/2009

OTHER PUBLICATIONS

International Search Report and Written Opinion; PCT Application No. PCT/US2016/019020; dated Nov. 17, 2016.

(Continued)

*Primary Examiner* — Gregory J Toatley, Jr.
*Assistant Examiner* — Terence E Stifter, Jr.
(74) *Attorney, Agent, or Firm* — Polsinelli PC

(57) ABSTRACT

Systems, methods and apparatuses for measuring properties of a borehole formation and generating an image of the formation. The method comprises selecting a direction for transmission of an electromagnetic signal, wherein the selection includes altering an electromagnetic coupling between an active element of a first device and at least one passive element of the first device. An electromagnetic signal can be transmitted, by the active element of the first device, into a borehole formation. The electromagnetic signal can subsequently be received by a second device. Formation properties can be determined from the received signal and an image of the formation can be generated.

20 Claims, 11 Drawing Sheets

(56) References Cited

U.S. PATENT DOCUMENTS

| | | |
|---|---|---|
| 5,434,507 A | 7/1995 | Beren et al. |
| 5,530,359 A | 6/1996 | Habashy et al. |
| 5,767,807 A | 6/1998 | Pritchett |
| 6,034,638 A | 3/2000 | Thiel et al. |
| 6,288,682 B1 | 9/2001 | Thiel et al. |
| 6,407,719 B1* | 6/2002 | Ohira ............... H01Q 3/44 343/750 |
| 7,363,160 B2 | 4/2008 | Seleznev et al. |
| 7,376,514 B2 | 5/2008 | Habashy et al. |
| 8,598,895 B2 | 12/2013 | Comparon et al. |
| 2002/0036586 A1* | 3/2002 | Gothard ............... H01Q 3/242 342/374 |
| 2007/0030210 A1 | 2/2007 | Shibata |
| 2008/0290873 A1 | 11/2008 | Homan et al. |
| 2011/0221443 A1* | 9/2011 | Bittar ............... G01V 3/30 324/339 |
| 2013/0030705 A1* | 1/2013 | Pei ............... E21B 47/082 702/6 |
| 2013/0154846 A1* | 6/2013 | Mangione ............... G01V 3/12 340/854.6 |
| 2013/0215715 A1* | 8/2013 | Hollstein ............... G01V 11/00 367/35 |
| 2017/0212269 A1* | 7/2017 | Itskovich ............... G01V 3/18 |

OTHER PUBLICATIONS

Bittar, Michael, et. al., "A Modern Microwave Formation Evaluation Sensor and its Applications in Reservoir Evaluation", SPLWA, 2010 pp. 1-10.

Calvert, Thomas J. et. al., "Electromagnetic Propagation a New Dimension in Logging", SPE 6542, 1977, pp. 1-15.

Cataldo, A. et. al., "A Noninvasive Resonance-Based Method for Moisture Content Evaluation Through Microstrip Antennas", IEEE Transactions on Instrumentation and Measurement, vol. 58, May 5, 2009, pp. 140-1426.

Chew, Weng Cho, "Modeling of the Dielectric Logging Tool at High Frequencies: Theory, IEEE Transactions on Geoscience and Remote Sensing", vol. 26, Jul. 4, 1988, pp. 382-387.

Chew, Weng Cho, "Modeling of the Dielectric Logging Tool at High Frequencies: Applications and Results", IEEE Transactions on Geoscience and Remote Sensing, vol. 26, Jul. 4, 1988, pp. 388-398.

Harrington, Roger F., "Reactively Controlled Directive Arrays", IEEE Transactions on Antennas and Propagation, vol. AP-26, No. 3, May 1978, pp. 390-395.

Kenyon, W.E., "Texture Effects on Megahertz Dielectric Properties of Calcite Rock Samples", Journal of Applied Physics, vol. 55, Issue 8, Apr. 15, 1984, pp. 3153-3159 (Abstract).

Ohira, Takashi et. al., "Electronically Steerable Parasitic Array Radiator Antenna", Electronics and Communications in Japan, Part 2, vol. 87, No. 10, 2004, pp. 25-45.

Thiel, D.V. et. al., "Switched Parasitic Antennas for Cellular Communications", Artech House, London London 2001.

* cited by examiner

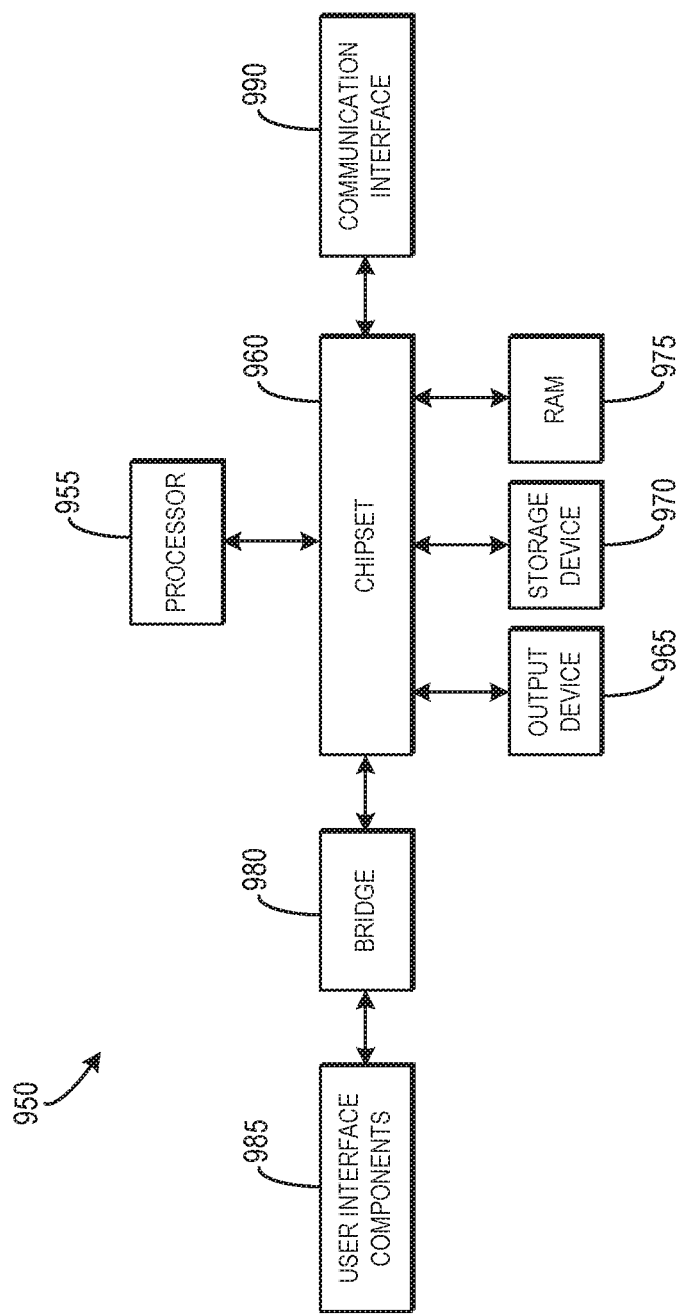

FORMATION IMAGING WITH ELECTRONIC BEAM STEERING

CROSS-REFERENCE TO RELATED APPLICATIONS

This application is a national stage entry of PCT/US2016/019020 filed Feb. 23, 2016, said application is expressly incorporated herein in its entirety.

TECHNICAL FIELD

The present technology pertains to well logging and formation evaluation, and more specifically to systems and methods for measuring and imaging properties of a formation.

BACKGROUND

During well operations, it is often desirable to generate images of formations within the subterranean well. To do so, current solutions employ the use of dielectric logging tools or micro-resistivity imaging tools positioned within the well. Dielectric logging tools generally perform measurements of high frequency electromagnetic data at individual pads in contact with the formation. The amplitude and phase difference between the pads are measured, and these data are interpreted to determine dielectric properties of the formation. Similarly, micro-resistivity imaging tools utilize a large array of pads in contact with the formation to determine formation properties. In micro-resistivity tools, the potential difference between individual pads is measured and used to create a resistivity image of the formation.

To generate a full circumferential image using current solutions, multiple pads must be deployed both axially and azimuthally about the tool body. This increases the electrical and mechanical complexity of the tool. Moreover, the pads must remain in contact with the formation as the tool is conveyed in and out of the borehole, resulting in increased mechanical wear.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 9A and 9B illustrate schematic diagrams of example computing systems for use with example system embodiments.

DETAILED DESCRIPTION

Figure 1A:
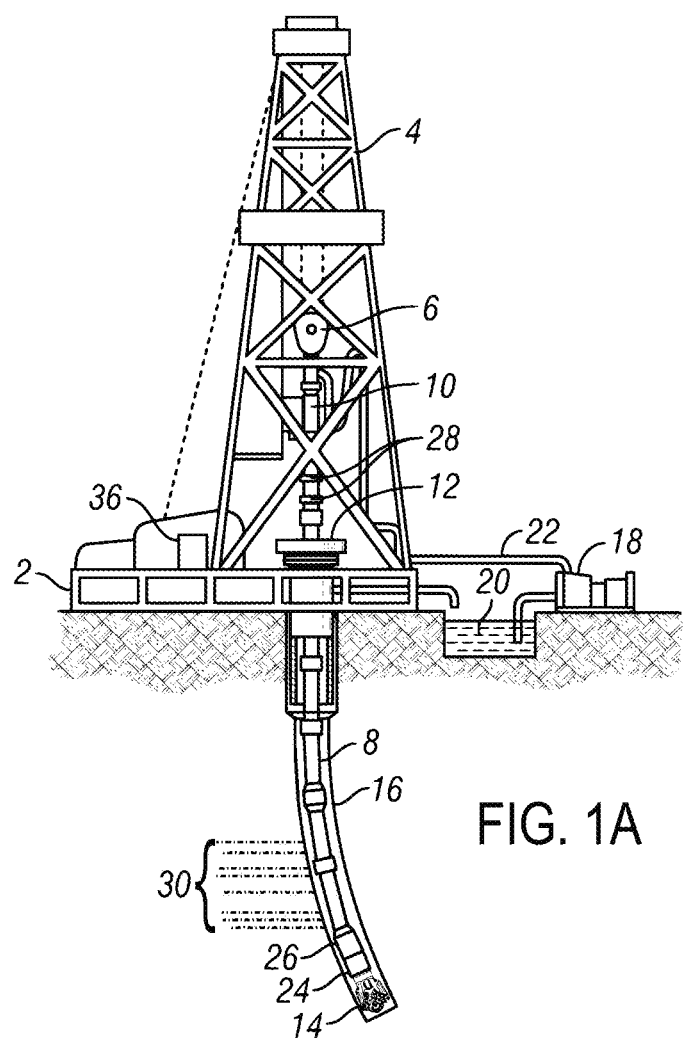
FIG. 1A illustrates a schematic diagram of an example logging-while-drilling (LWD) environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "transceiver" is defined as a combination of a transmitter/receiver in one package but can include a separate transmitter and a separate receiver in one package or two packages.

The approaches set forth herein describe a formation imaging tool that can measure the conductivity and dielectric properties of a formation at a number of pre-determined frequencies and generate high resolution images of the formation. The formation imaging tool includes one or more electronically steerable antenna systems that can scan azimuthally about the tool body to measure the conductivity and dielectric properties of the formation. The radiation pattern of the antenna system can be dynamically controlled, and is highly directional in the azimuthal and axial planes of the tool body. The antenna system can be a dielectric-loaded electronically steerable passive array radiator (D-ESPAR) antenna. The electronic steering of the antenna system can emulate the physical rotation of a fixed antenna array, thus obviating the need for tool body rotation. The antenna system can be mounted inside the tool body, and does not require direct contact with formation. The antenna system can be centralized in the borehole by a centralizer and caliper, such that the stand-off between the tool and formation can be measured and controlled. The tool can be operated with standoff in resistive drilling fluids (e.g., oil-based mud, OBM, and related emulsions). Measured voltage amplitude and phase signals from the antenna system can be processed and/or inverted to generate 1D, 2D or 3D formation images.

Disclosed are systems, methods and apparatuses for measuring properties of a borehole formation and generating an image of the formation. The method comprises selecting a direction for transmission of an electromagnetic signal, wherein the selection includes altering an electromagnetic coupling between an active element of a first device and at least one passive element of the first device. An electromagnetic signal can be transmitted, by the active element of the first device, into a borehole formation. The electromagnetic signal can subsequently be received by a second device. Formation properties can be determined from the received signal and an image of the formation can be generated.

The disclosed formation imaging tools, systems and methods are best understood in the context of the larger systems in which they operate. Accordingly, FIG. 1A shows an illustrative logging-while-drilling (LWD) environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations 30. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

A downhole tools unit 24 can be integrated into the bottom-hole assembly near the bit 14. As described in detail below, the downhole tools unit 24 can include a formation imaging tool that can utilize one or more antenna system to measure various formation properties, such as the conductivity or dielectric properties of a formation. The antenna system in the formation imaging tool can be electronically steerable to obviate the need for tool rotation. The downhole tools unit 24 can also include one or more sensors, calipers, centralizers, and/or other tools to measure additional properties of the borehole 16 and/or control the distance between the tool and the wall of borehole.

As the bit extends the borehole through the formations, the downhole tools unit 24 can collect the various measurements pertaining to the formation and can store the measurements in internal memory and/or communicate the measurements to the surface. For purposes of communication, a downhole telemetry sub 26 can be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a surface telemetry sub 28 can receive the uplink signal from the downhole telemetry sub 26 and can communicate the signal to a data acquisition module 36. Module 36 can include one or more processors, storage mediums, input devices, output devices, software, and the like as described in detail in FIGS. 9A-B. Module 36 can store and/or process the data received from the downhole tools unit 24 and can use the data to generate high resolution one-dimensional (1D), two-dimensional (2D), and/or three-dimensional (3D) images of the formation.

Figure 1B:
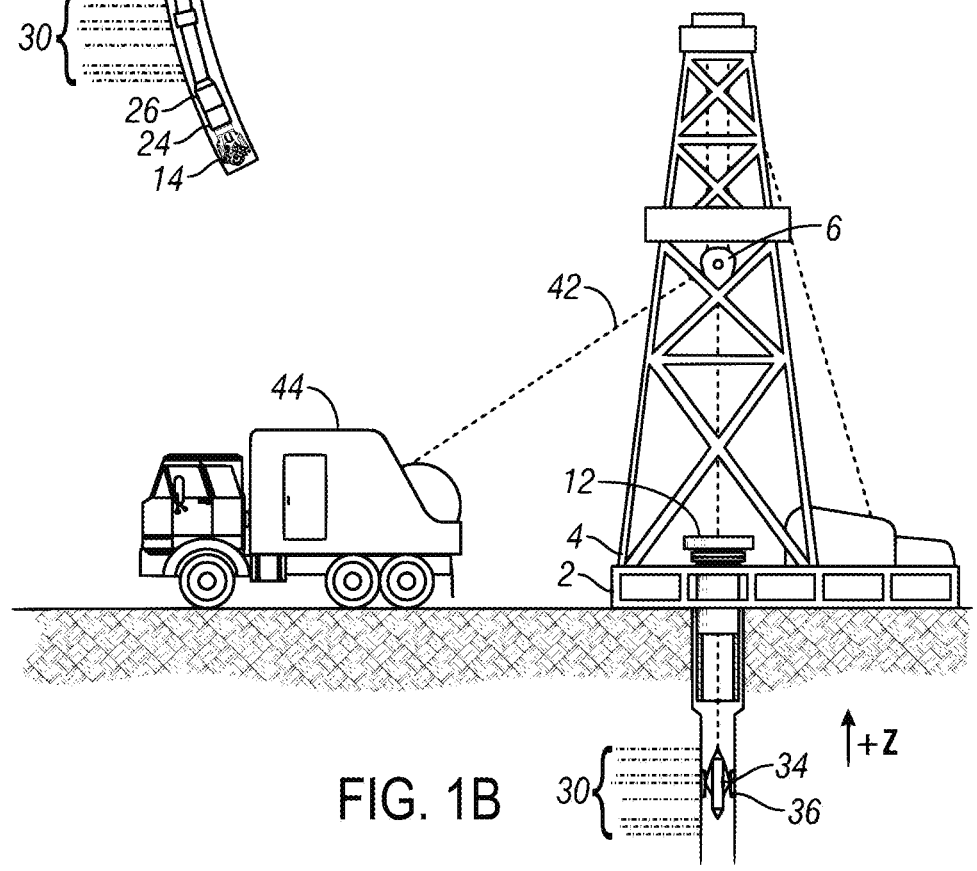
FIG. 1B illustrates a schematic diagram of an example wireline logging environment.

At various times during the drilling process, the drill string 8 may be removed from the borehole as indicated in FIG. 1B. Once the drill string has been removed, logging operations can be conducted using a wireline logging tool 34, i.e., a sensing instrument sonde suspended by a cable 42 having conductors for transporting power to the tool and telemetry from the tool to the surface. A formation imaging tool can be included in the logging tool 34 and can utilize one or more antenna system to measure various formation properties, such as the conductivity or dielectric properties of a formation. The antenna system in the formation imaging tool can be electronically steerable to obviate the need for tool rotation. One or more of a mechanical, an acoustic, and/or an ultrasonic caliper can be included within or adjacent to the wireline logging tool 34 to measure the rugosity of the borehole and/or the distance between the tool and the borehole wall. A centralizer 36 can be used to control the distance between the wireline logging tool 34 and the borehole wall, for example, to ensure the wireline logging tool 34 is centered within the borehole. Furthermore, one or more sensors, such as a resistivity sensor, and/or other devices can be included within or adjacent to the wireline logging tool 34 to collect measurements of additional borehole and formation properties.

The measurements collected by wireline logging tool 34 can be transmitted to a logging facility 44 at the surface of the well. The logging facility 44 can include computing facilities for storing and/or processing the measurements, for example, to generate high resolution 1D, 2D, and/or 3D images of the formation. The logging facility 44 can also communicate the measurements to a remote location, such as a high performance computing or cloud computing network.

Although FIGS. 1A and 1B depict specific borehole configurations, it should be understood by those skilled in the art that the present disclosure is equally well suited for use in wellbores having other orientations including vertical wellbores, horizontal wellbores, slanted wellbores, multilateral wellbores and the like. Also, even though FIGS. 1A and 1B depict an onshore operation, it should be understood by those skilled in the art that the present disclosure is equally well suited for use in offshore operations. Moreover, it should be understood by those skilled in the art that the present disclosure is not limited to the environments depicted in FIGS. 1A and 1B, and can also be used, for example, in other well operations such as production tubing operations, jointed tubing operations, coiled tubing operations, combinations thereof, and the like.

To allow for formation imaging in accordance with the present disclosure, one or more antenna system can be used. Each antenna system can consist of one or more antennae and can be paired with one or more transmitter, receiver, and/or transceiver. Although any number of antenna system configurations is suitable, it can be useful to utilize an electronically steerable antenna system to, for example, obviate the need for rotation of the antenna to generate a full circumferential image of a formation, thus reducing the electrical and mechanical complexity of the antenna system.

Figure 2:
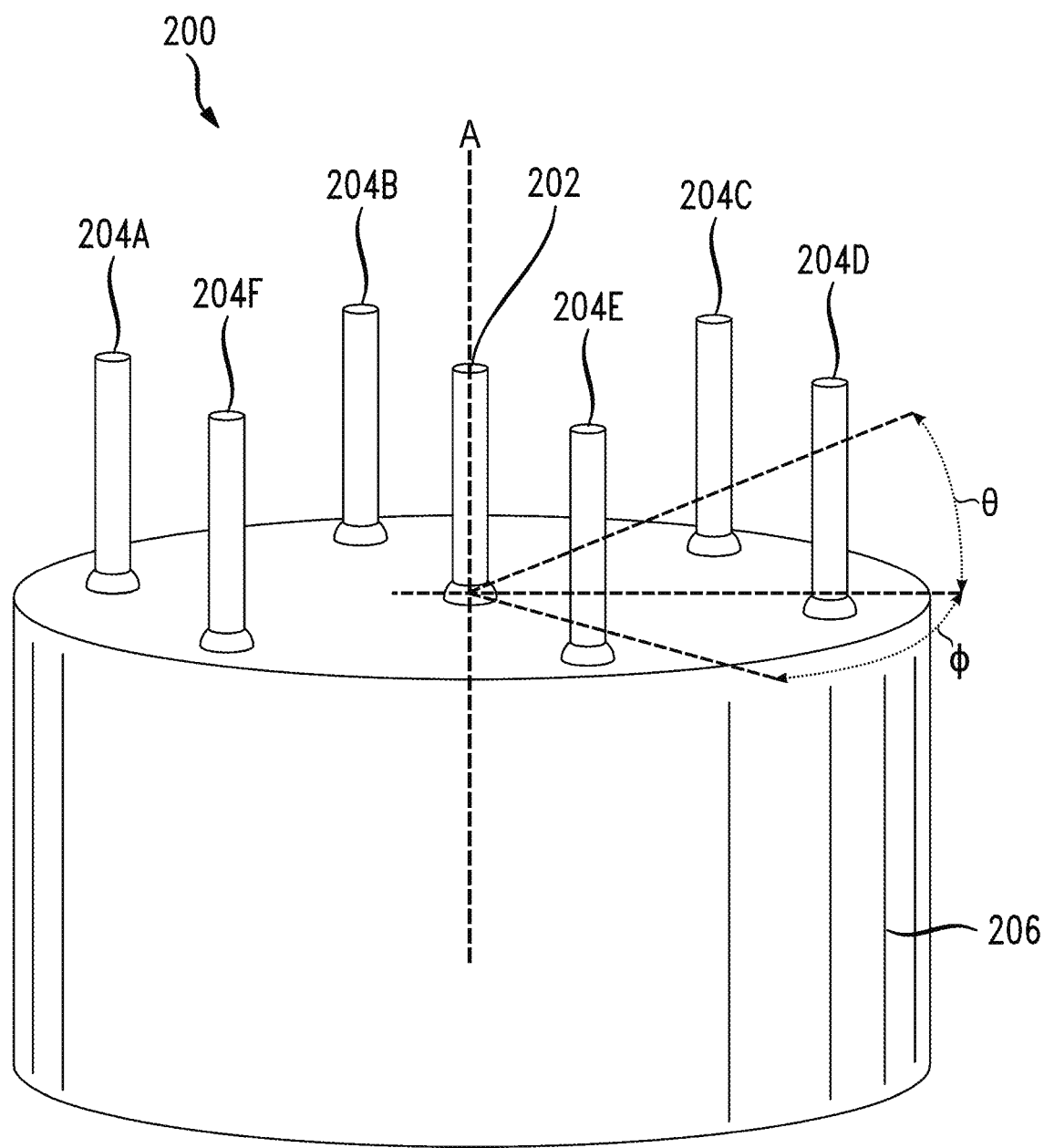
FIG. 2 illustrates an example of an electronically steerable passive array radiator (ESPAR) antenna.

FIG. 2 illustrates an electronically steerable passive array radiator (ESPAR) antenna system 200 in accordance with one embodiment of the present disclosure. Antenna system 200 can include an array of passive (which can also be referred to as parasitic) radiating elements 204A-F disposed about an active radiating element 202. Each of the passive elements 204A-F and the active element 202 can be a monopole or dipole antenna and can extend parallel to a tool body 206 along axis A. The passive elements 204A-F can be arranged symmetrically around the axis of tool body 206 in a circular array, although other arrangements are contemplated. Moreover, although a specific configuration of active and passive elements is shown, the antenna system 200 can utilize any configuration of radiating elements so long as it includes one active radiating element and at least one passive radiating element placed in the near field of the active radiating element.

The antenna system 200 can include one or more transmitter, receiver, and/or transceiver coupled with the active element 202 to transmit and/or receive an electromagnetic signal, such as a radio frequency (RF) signal or any other signal emitting electromagnetic radiation. The active element 202 can have a single feed point to simplify the impedance matching and maximize the energy transfer between the active element 202 and the transmitter, receiver, and/or transceiver coupled therewith. The antenna system 200 can also include one or more devices, such as a switch and/or a varactor, coupled with each of the passive elements 204A-F to dynamically adjust the reactive load of the respective passive element. The one or more devices coupled with each of the passive elements 204A-F can be distributed so that the total loss in antenna system 200 is minimized. The electronics coupled with active element 202 and passive elements 204A-F, as well as other devices associated with antenna system 200, can be disposed within a proximity of antenna system 200 or within tool body 206.

Unlike other steerable antenna systems which require transmission lines between individual radiating elements, the radiation pattern of antenna system 200 can be formed by the electromagnetic coupling among active element 202 and passive elements 204A-F. Thus, by varying the reactive loads of the passive radiating elements 204A-F, the coupling among the elements can be altered and the direction of maximum gain of antenna system 200 can be changed. In this manner, the antenna system 200 can be electronically steerable and can be highly directional in the azimuthal plane φ and axial plane θ of the tool body 206. The radiation pattern of the antenna system 200 can vary from omnidirectional to highly directional, depending whether the passive elements 204A-F are open circuited (effectively), reactively loaded, or short circuited. A finite but highly conductive ground plane can be included below active element 202 and passive elements 204A-F, such as in tool body 206, to enhance the horizontal directionality of the antenna system 200. The ground plane can extend perpendicular to axis A and can be made from a metal, such as copper, a copper alloy, a copper-plated metal, a gold-plated metal, and the like.

Figure 3:
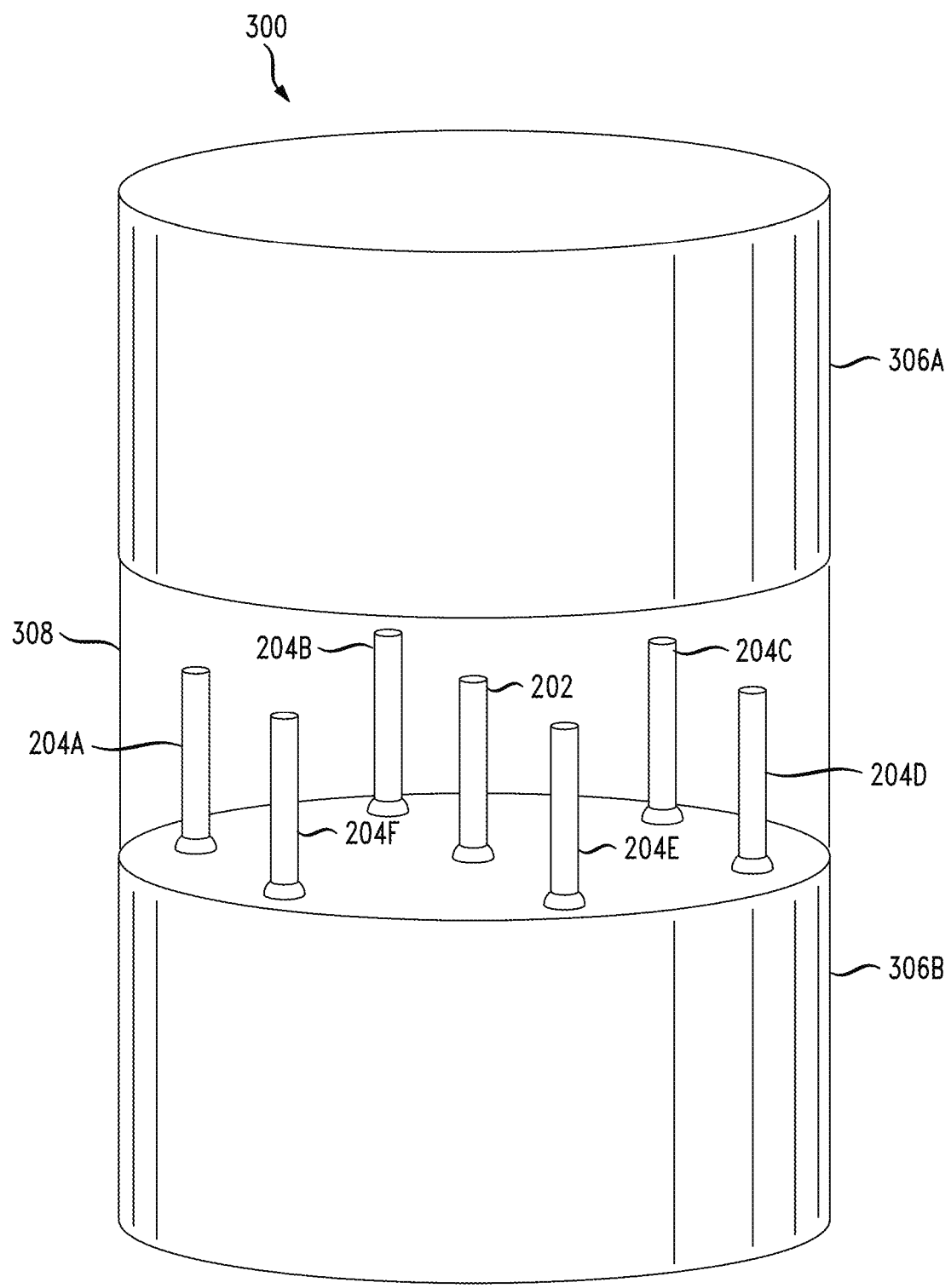
FIG. 3 illustrates an example dielectric-embedded electronically steerable passive array radiator (D-ESPAR) antenna.

FIG. 3 illustrates an example of a dielectric-embedded electronically steerable passive array radiator (D-ESPAR) antenna system 300 which includes an array of passive (which can also be referred to as parasitic) radiating elements 204A-F disposed about an active radiating element 202. Antenna system 300 is substantially similar to antenna system 200 and therefore, to avoid repetition, only the differences between the two will be described. As illustrated, the active and passive radiating elements in antenna system 300 are embedded in a dielectric material 308. The dielectric material 308 can be a resistive material and can have a dielectric constant between about 3 and about 150. The dielectric material 308 can be selected to have an impedance that is comparable to or matches the impedance of a fluid, such as a drilling fluid, surrounding antenna system 300. By including the dielectric material 308, the transmission/reception loss across the dielectric-fluid boundary can be minimized which can allow the antenna system 300 to have a relatively smaller size than antenna system 200. Moreover, the dielectric material 308 and tool bodies 306A-B can provide mechanical support to the antenna system 300 and can protect the active and passive radiating elements. Tool body 306A and/or 306B can include the electronics and other devices associated with antenna system 300 and can also include a finite but highly conductive ground plane to enhance the horizontal directionality of the antenna system. The ground plane can be made from a metal, such as copper, a copper alloy, a copper-plated metal, a gold-plated metal, and the like.

FIGS. 4A-F illustrate graphical representations of radiation patterns at 60° intervals for an example antenna system, such as antenna system 200 or antenna system 300. In each figure, the radiation pattern depicts the relative field strength transmitted from and/or received by the antenna. The radiation pattern can be taken along the azimuth plane or axial plane of the antenna and can be from a linear vertical or a linear horizontal polarization. The relative field strength of the pattern can be measured in decibels (dB) at a frequency between about 1 megahertz (MHz) and about 5 gigahertz (GHz).

Figure 4A:
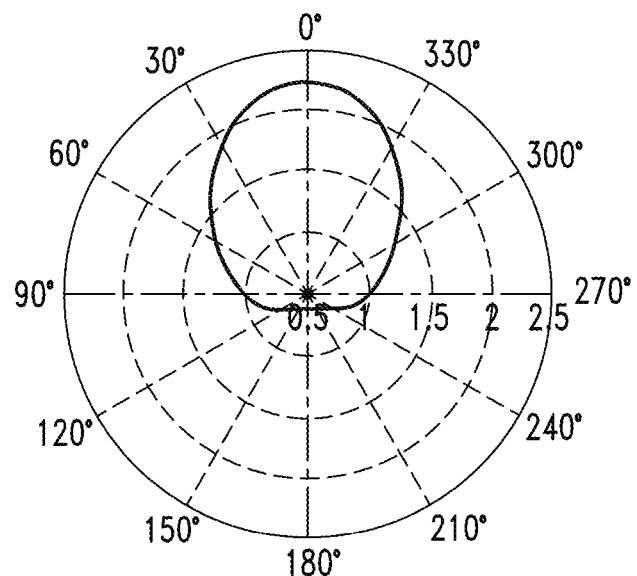
FIG. 4A-F illustrate graphical representations of radiation patterns at different intervals for an example antenna.
Figure 4B:
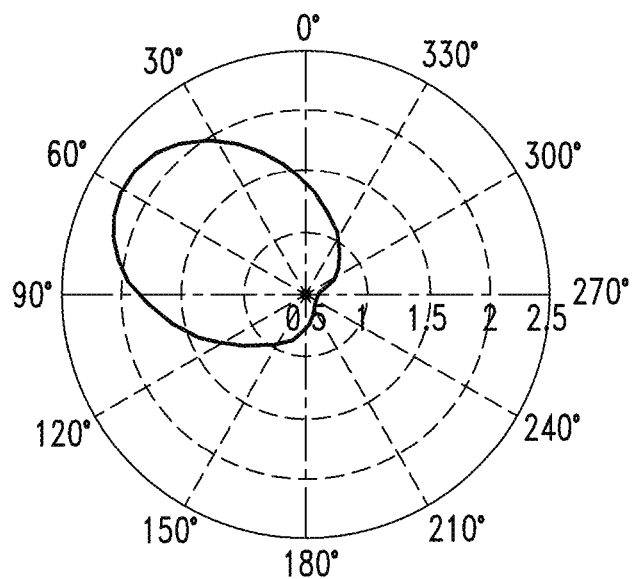
Figure 4C:
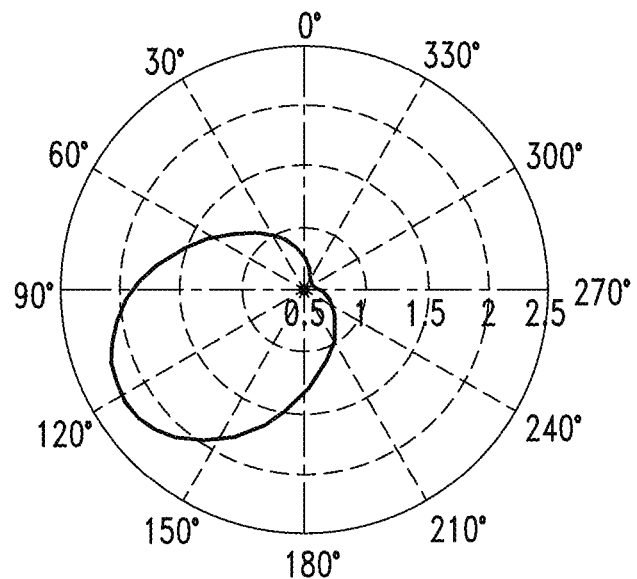
Figure 4D:
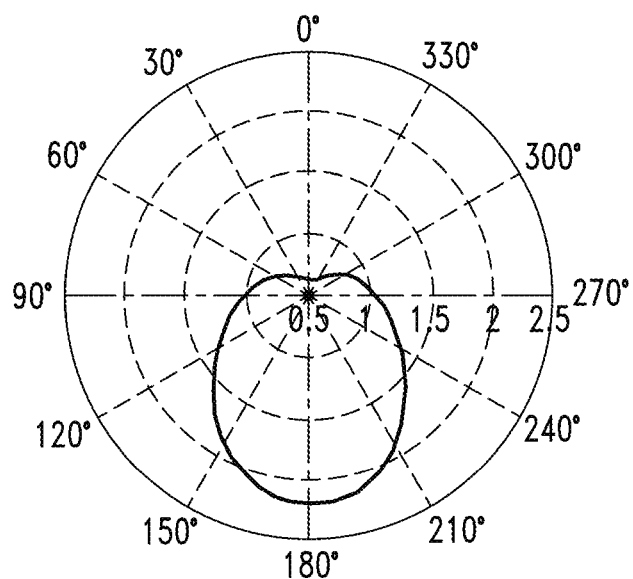
Figure 4E:
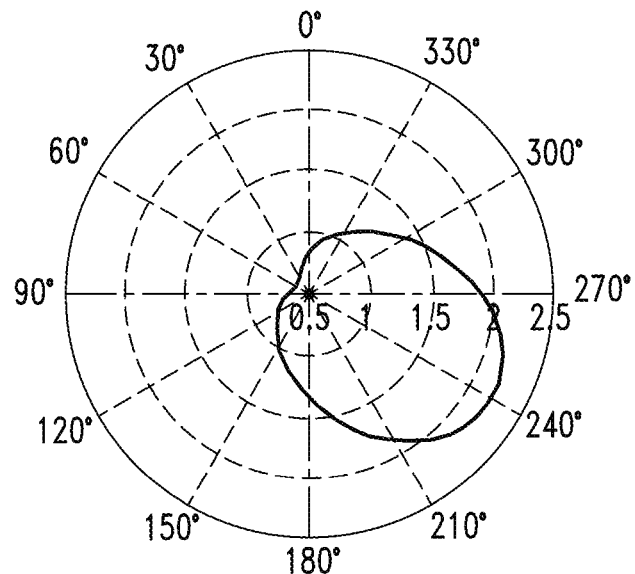
Figure 4F:
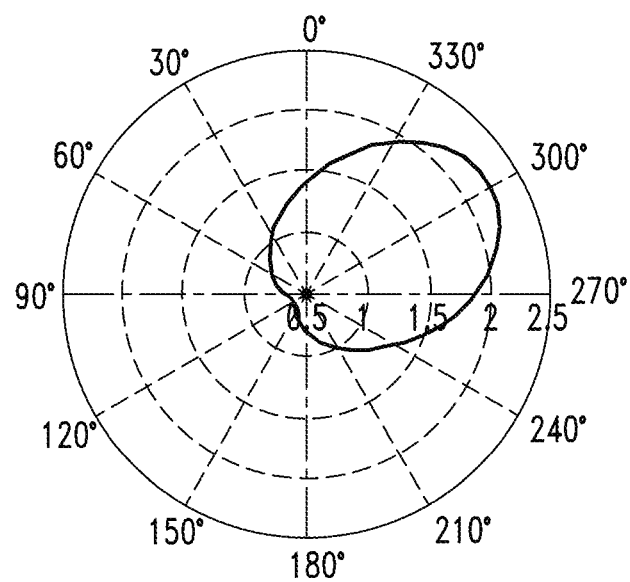

As previously discussed, the radiation pattern of antenna systems 200 and 300 can be formed by the electromagnetic coupling among active element 202 and passive elements 204A-F. Thus, by varying the reactive loads of the passive radiating elements 204A-F, such as by creating an (effective) open circuit at an element, by reactively loading the element with one or more switch and/or varactor, or by short circuiting the element, the coupling among the elements can be altered and the direction of maximum gain of the antenna system can be changed. As a non-limiting example, an antenna system can have an active radiating element located at the origin or center of FIGS. 4A-F, and can have passive radiating elements located at 0°, 60°, 120°, 180°, 240°, and 300° of FIGS. 4A-F. To select the direction of maximum gain of the antenna system to be directed toward 0° as illustrated in FIG. 4A, the electromagnetic coupling between the elements can be altered by short-circuiting the passive radiating elements located at 60°, 120°, 180°, 240°, and/or 300°, and reactively loading or (effectively) open-circuiting the passive element located at 0°.

Figure 5:
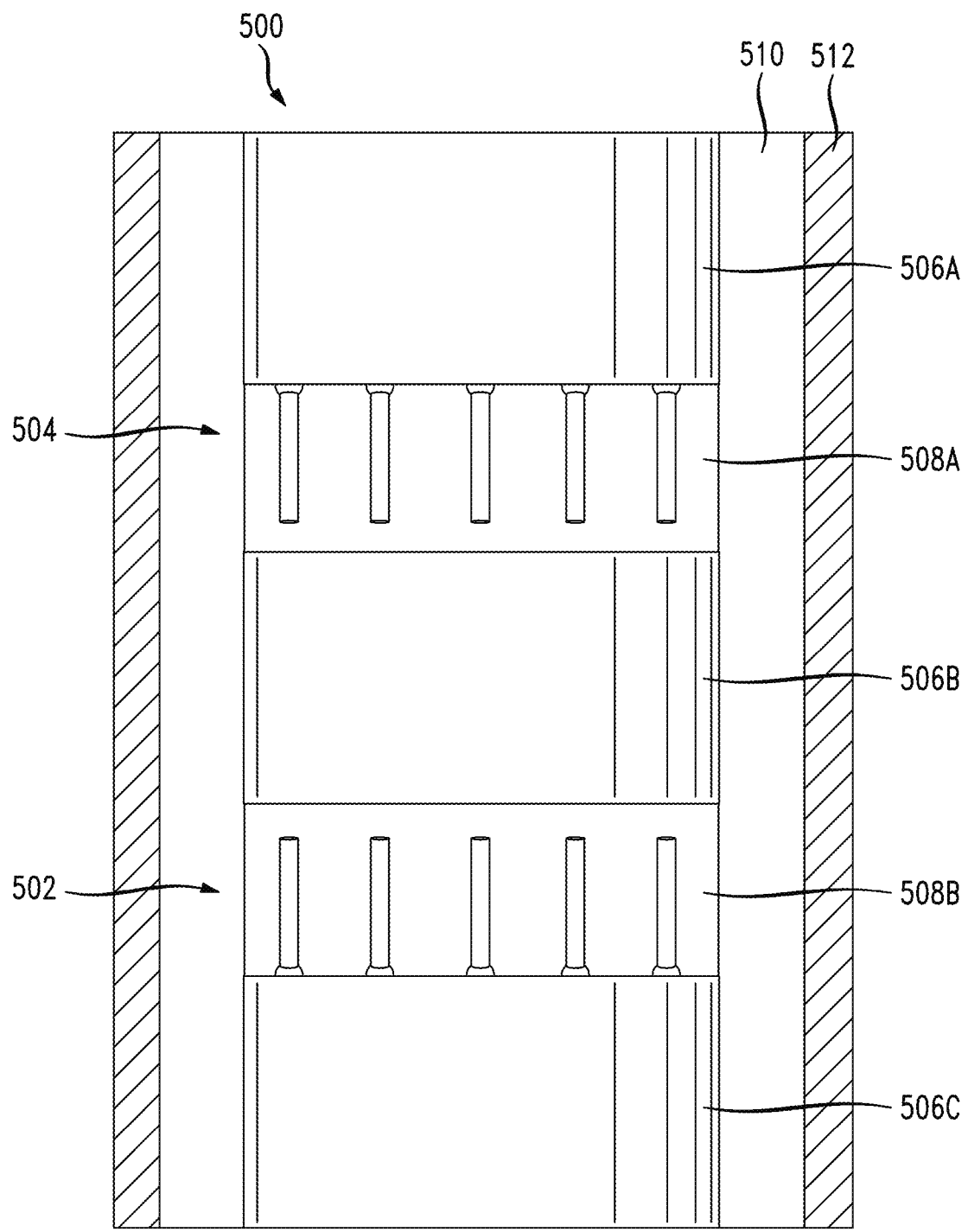
FIG. 5 illustrates an example formation imaging tool.

FIG. 5 illustrates an example formation imaging tool 500 in accordance with one embodiment of the present disclosure. Formation imaging tool 500 can include at least one transmitter antenna system 502 and at least one receiver antenna system 504. The antenna systems 502 and 504 can be D-ESPAR antenna systems, such as antenna system 300, having an active radiating element and at least one passive radiating element. The length and spacing of the active and passive elements in antenna systems 502 and 504 can be optimized for the desired operating frequency or frequencies of the formation imaging tool 500. The elements in antenna systems 502 and 504 can also be embedded with dielectric materials 508A and 508B. Dielectric materials 508A and 508B can be the same or different dielectric materials and can have a dielectric constant between about 3 and about 150. The dielectric materials 508A and 508B can be selected to have an impedance that is comparable to or matches the impedance of a fluid 510, such as a drilling fluid, surrounding the formation imaging tool 500. By including the dielectric materials 508A and 508B, the transmission/reception loss across the dielectric-fluid boundary can be minimized which can allow the formation imaging tool 500 to have a relatively smaller size.

Tool bodies 506A-C can provide mechanical support to the antenna systems 502 and 504 and can form the structure of formation imaging tool 500. The height of tool body 506B can be selected to set the spacing between antenna systems 502 and 504. Such a selection can be based on, for example, the radiation patterns of antenna systems 502 and 504, the diameter of the borehole in which the tool 500 is deployed, the depth of investigation (DOI) of the tool 500, the operating frequency or frequencies of tool 500, one or more properties of fluid 510, one or more properties of formation 512, and the like. One or more of the tool bodies 506A-C can include the electronics, such as one or more transmitter, receiver, and/or transceiver, and other devices associated with formation imaging tool 500. One or more of the tool bodies 506A-C can also include a finite but highly conductive ground plane to enhance the horizontal directionality of the antenna system. The ground plane can be made from a metal, such as copper, a copper alloy, a copper-plated metal, a gold-plated metal, and the like. The formation imaging tool 500 can also include one or more of a processor, storage medium, software and the like as described in reference to FIGS. 9A and 9B so that the tool can perform operations such as execute, collect, process, and/or store data.

In operation, formation imaging tool 500 can be positioned within a borehole in the proximity of a formation 512. As a non-limiting example, formation 512 can be a subterranean formation within the borehole, and formation imaging tool 500 can be positioned adjacent to formation 512 by a wireline device. To ensure formation imaging tool 500 is centered within the borehole, a mechanical, an acoustic, and/or an ultrasonic caliper can measure a distance between the center of the of the tool and the borehole as described in reference to FIGS. 8A-C. Based on the measured distance, one or more centralizers located within or adjacent to formation imaging tool 500 can be used to adjust the position the tool so that it is centered in the borehole and/or not in contact with the borehole. Moreover, the caliper can measure the rugosity of the borehole wall. The measured distance and/or rugosity can be fed back to formation imaging tool 500 as data so that the tool can store the data, transmit the data, and/or adjust transmission/reception parameters to account for the data.

Once the formation imaging tool 500 is positioned, the tool can scan the surrounding formation 512 along its azimuth plane or axial plane to measure various properties of the formation. To do so, the formation imaging tool 500 can select the direction of maximum gain for the antenna systems 502 and 504 by altering the electromagnetic coupling among the active and passive elements in the individual antenna systems. As previously discussed, the electromagnetic coupling can be altered by modifying the reactive load of one or more of the passive elements in the individual antenna systems, such as by short-circuiting, (effectively) open-circuiting, or reactive loading. The direction of maximum gain for the transmitter antenna system 502 and receiver antenna system 504 can be selected to be in phase so that they have maximum sensitivity to the same volume of the formation 512.

After setting the direction of maximum gain for the transmitter antenna system 502 and/or the receiver antenna system 504, an electromagnetic signal can be transmitted from the transmitter antenna system 502, through a fluid 510, and into the formation 512. The frequency of the electromagnetic signal can be selected so that characteristics of the formation 512 (e.g., rock texture and water saturation) can be detected, so that the textural effects of formation 512 are minimized, and/or so that water-filled porosity in the formation 512 can be determined independent of water salinity. The frequency of the electromagnetic signal can be between about 1 MHz and about 5 GHz, or between about 100 MHz and about 2.5 GHz, or between about 1 GHz and about 2 GHz. The electromagnetic signal can be transmitted as a single frequency signal, or can be transmitted as sequential signals having multiple different frequencies. The fluid 510 can be air, a drilling fluid such as oil-based mud or related emulsions, or any other resistive fluid. In some cases, a resistivity sensor, such as a micro-resistivity sensor, can be placed on the formation imaging tool 500 to measure the resistivity of the fluid 510. The measured resistivity can be fed back to the formation imaging tool 500 so that the tool can store the resistivity, transmit the resistivity as measured data, and/or adjust transmission/reception parameters to account for the resistivity.

The receiver antenna system 504 can receive the electromagnetic signal transmitted into the formation 512 by transmitter antenna system 502. As described below in reference to FIG. 6, properties such as the gain and phase of the receiver antenna system 504 can be measured for the received electromagnetic signal and can be used to determine various properties of the formation 512. The measured properties can be stored and/or processed locally within formation imaging tool 500, or can be transmitted to a remote location for storage and/or processing. Once the electromagnetic signal is received and the gain and phase of the receiver is determined, the direction of maximum gain can be incremented to focus on a new volume of the formation 512. The electromagnetic signal can be transmitted by transmitter antenna system 502 into this new volume, and then received by receiver antenna system 502. In this manner, the formation imaging tool 500 can conduct a full azimuthal scan (i.e., a 360° scan) of formation 512 and can measure various properties of the formation at each point. In some cases, the formation imaging tool 500 can conduct multiple scans of the same formation at a single or multiple frequencies, and can bin, stack, and/or process the multiple measurements for purposes such as noise reduction.

Although a specific configuration of formation imaging tool 500 was described above in reference to FIG. 5, it should be understood by those skilled in the art that other configurations are equally suitable. For example, a transmitter antenna system can be located above a receiver antenna system, multiple transmitter and receiver antenna systems operating at the same or different frequencies can be used, or a single antenna system coupled with a transceiver can be used instead of separate antenna systems. Moreover, it should be understood by those skilled in the art that the specific process of scanning a formation 512 to measure various properties with formation imaging tool 500 is not limited to any specific order and may include fewer or additional steps.

Figure 6:
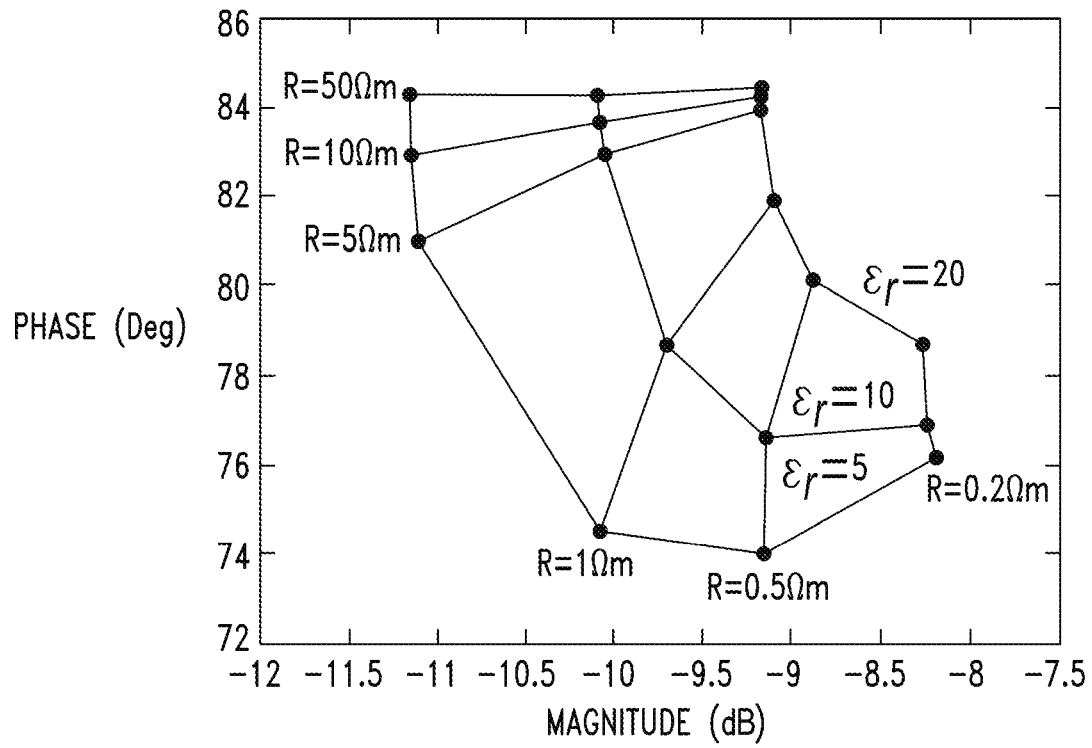
FIG. 6 illustrates a graphical representation of the gain and phase at the receiver of an example formation imaging tool for different measured formation properties.

FIG. 6 illustrates a graphical representation of the gain and phase at the receiver of an example formation imaging tool for different measured formation properties. As illustrated, the gain and phase of the receiver can be used to determine the conductivity, dielectric properties, and/or other properties of a formation. The conductivity and dielectric properties of the formation models can be frequency-dependent and/or anisotropic, and can be expressed as functions of resistivity, conductivity, relative permittivity, permeability, chargeability, and/or other induced polarization parameters. Additional formation properties, such as water saturation and/or volume, and rock texture parameters (e.g., grain size, grain orientation, fraction volume pyrite, fraction volume clay, etc.) can be extracted from the conductivity and/or dielectric properties of the formation via physics models based on algebraic transforms and/or inversion. The physics models that relate the formation properties with the conductivity and/or dielectric properties and vice versa can be empirical (e.g., based on Archie's Law) or can be deterministic (e.g., based on an effective medium theory). Moreover, the modeling methods may be based on any combination of analytical, semi-analytical, finite-difference, finite-volume, finite-element, boundary-element, integral equation methods implemented in Cartesian, cylindrical, and/or polar coordinates.

Once relevant properties of the formation are determined, one or more high resolution images of the formation can be generated. These images can be generated, for example, by one or more computer system located within the formation imaging tool, at the surface of the borehole within which the tool is deployed, or at another remote location. Single frequency data measured in the formation imaging tool's azimuthal and/or axial directions can be stitched and processed about the azimuth and/or axis to form a 2D formation image. Multiple frequency data measured in the formation imaging tool's azimuthal and/or axial directions can be stitched and processed about the azimuth and/or axis to form a 3D formation image, where frequency is a proxy for the depth of investigation in the formation. The data measured from at least one azimuth and/or axial and depth of the formation can be inverted and used in conjunction with borehole rugosity data, such as that collected from caliper measurements, and borehole fluid resistivity data, such as from resistivity sensor measurements, to generate a radial 1D model, inclusive of borehole fluid, stand-off, invasion zones, and/or formation properties.

The previously disclosed processing, modeling, and inversion methods can be encapsulated in software which can be programmed on serial and/or parallel processing architectures. The processing, modeling, and inversion, and/or related functions can be performed remotely from the well site (e.g., using networked or cloud computers), whereby computers at the well site are connected to the remote processing computers via a network. In this manner, the computers at the well site do not require high computational performance and, subject to network reliability, all dielectric processing, modeling, and/or inversion can effectively be done in real time regardless of whether a 1D, 2D or 3D image is being generated.

Figure 7:
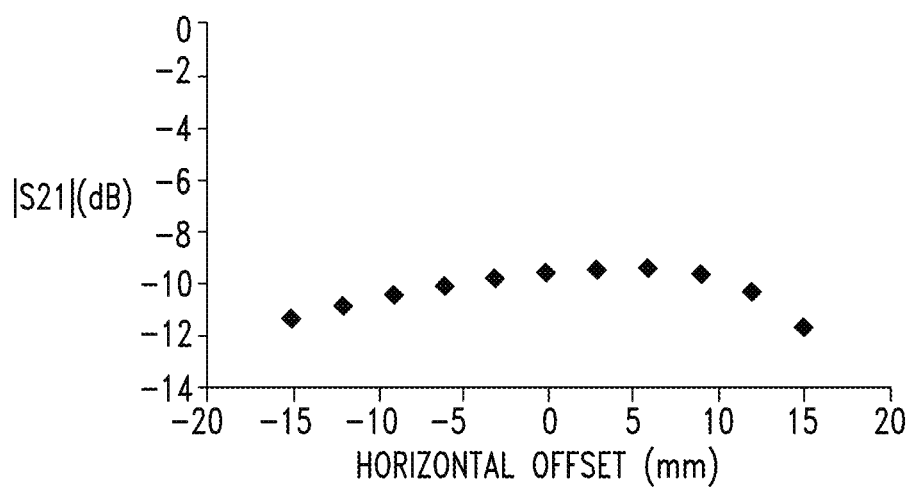
FIG. 7 illustrates a graphical representation of the amplitude of a received signal as a function of horizontal offset in a borehole for an example formation imaging tool.

FIG. 7 illustrates a graphical representation of the amplitude of a received signal as a function of horizontal offset in a borehole for an example formation imaging tool. The received signal can be a signal received at the receiver port for a transmission from the transmitter port of the formation imaging tool. The amplitude of the received signal can be an absolute value and can be measured in decibels (dB). As a non-limiting example, the received signal can have a frequency of about 2.4 GHz, and the formation imaging tool can include a pair of D-ESPAR antenna systems and can be measuring a formation with a dielectric constant of about 3 and resistivity of about 1 Ωm from within a borehole filled with oil-based mud. The horizontal offset can be measure in millimeters (mm) and can be the difference between the center of the formation imaging tool and the borehole, where 0 mm represents the center of the borehole. To better describe the horizontal offset, reference is now made to FIGS. 8A-C.

Figure 8A:
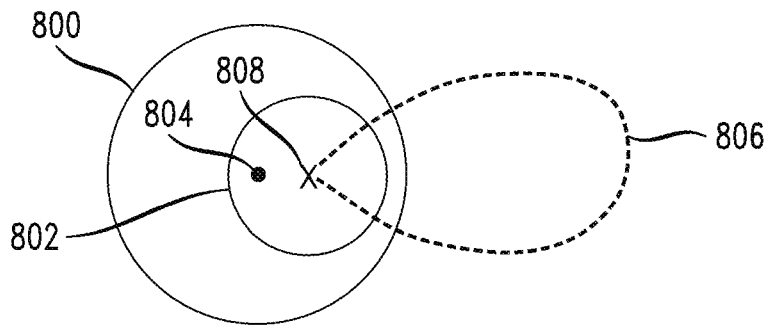
FIG. 8A-C illustrates an example of the horizontal offset described in FIG. 7.
Figure 8B:
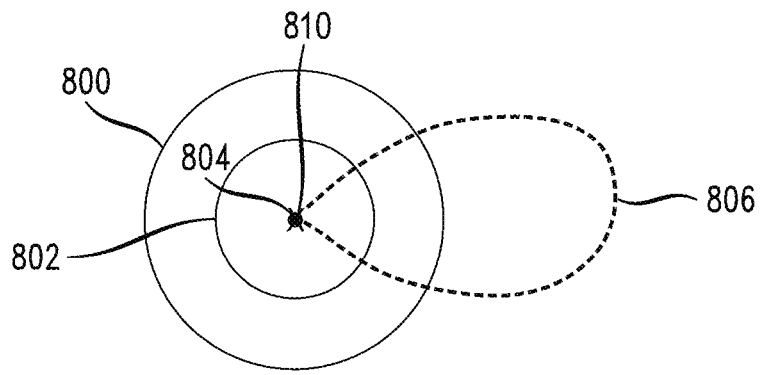
Figure 8C:
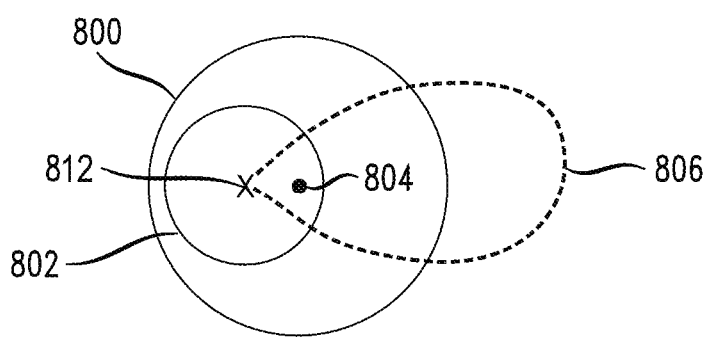

FIGS. 8A-C illustrate a cross-sectional view of a formation imaging tool 802 disposed within a borehole 800. The formation imaging tool 802 has a radiation pattern 806, and the borehole 800 has a center 804. The center 804 of the borehole 800, as well as the center of the formation imaging tool 802, can be determined using a mechanical caliper, an acoustic caliper, an ultrasonic caliper, and the like. In FIG. 8A, the formation imaging tool 802 has a center position 808 which can indicate a positive horizontal offset from the center 804 of the borehole 800. In FIG. 8B, the formation imaging tool 802 has a center position 810 that is equal to the center 804 of the borehole 800. This can indicate that the formation imaging tool 802 is centered in the borehole 800. Lastly, in FIG. 8C, the formation imaging tool 802 has a center position 812, which can indicate a negative horizontal offset from the center 804 of the borehole 800.

Figure 9A:
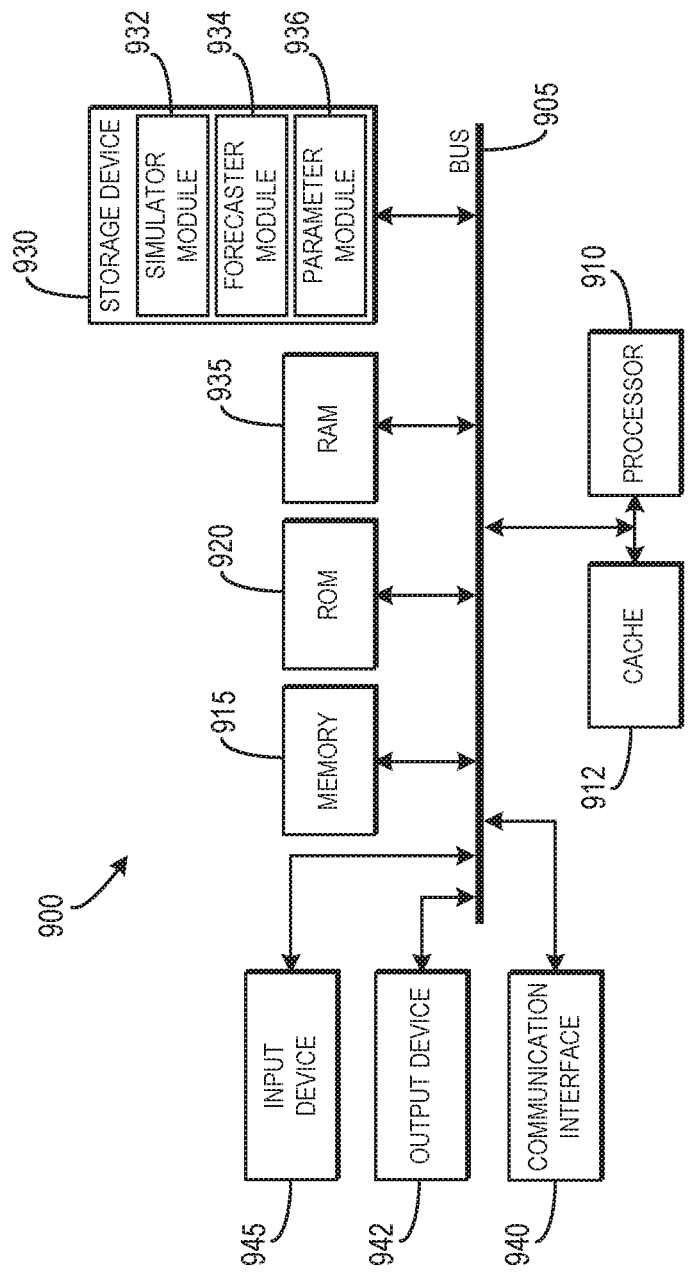

FIG. 9A and FIG. 9B illustrate example computing systems for use with example system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. System 900 can include a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 942 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, output device 942, and so forth, to carry out the function.

FIG. 9B illustrates an example computer system 950 having a chipset architecture that can be used in executing the described method and generating and displaying a graphical user interface (GUI). Computer system 950 can be computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. Chipset 960 can output information to output device 965, such as a display, and can read and write information to storage device 970, which can include magnetic media, and solid state media. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that systems 900 and 950 can have more than one processor 910 or be part of a group or cluster of computing devices networked together to provide greater processing capability.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

Statements of the Disclosure Include:

Statement 1: A method, comprising: selecting a direction for transmission of an electromagnetic signal, wherein the selection comprises altering an electromagnetic coupling between an active element of a first device and at least one passive element of the first device, transmitting, by the active element of the first device, the electromagnetic signal into a borehole formation, and receiving, by a second device, the electromagnetic signal.

Statement 2: The method according to Statement 1, further comprising: processing the received electromagnetic signal to determine one or more properties of the borehole formation.

Statement 3: The method according to Statement 1 or 2, wherein the properties include one or more of a conductivity and a dielectric property of the formation.

Statement 4: The method according to any of Statements 1-3, further comprising: generating an image of the formation based on the properties of the formation.

Statement 5: The method according to any of Statements 1-4, further comprising: automatically measuring a horizontal distance between the center of the first device and the center of the borehole, and positioning, based on the horizontal distance, the first device so that the center of the first device matches the center of the borehole.

Statement 6: The method according to any of Statements 1-5, wherein the horizontal distance is measured by one or more caliper coupled with at least one of the first device and the second device.

Statement 7: The method according to any of Statements 1-6, wherein the active element and the at least one passive element are antennae and are embedded in a dielectric material having a dielectric constant between about 3 and about 150.

Statement 8: The method according to any of Statements 1-7, wherein the electromagnetic signal comprises a single frequency or multiple frequencies between about 100 MHz and about 2.5 GHz.

Statement 9: The method according to any of statements 1-8, wherein the first device and the second device are separated from the formation by a fluid.

Statement 10: The method according to any of statements 1-9, wherein the fluid is a resistive fluid, and wherein the method further comprises: measuring, by a sensor, a resistance of the fluid.

Statement 11: The method according to any of Statements 1-10, wherein the direction is a direction of maximum gain and altering the electromagnetic coupling comprises varying a reactive load of the passive element.

Statement 12: A system, comprising: a first device comprising an active element for transmitting an electromagnetic signal into a borehole formation and at least one passive element for altering a direction of transmission of the electromagnetic signal, a second device having and active element for receiving the electromagnetic signal and at least one passive element for altering a direction of reception of the electromagnetic signal, a processor coupled with the second device for receiving the electromagnetic signal, and a computer-readable storage medium having stored therein instructions which, when executed by the processor, cause the processor to perform operations comprising: processing the received electromagnetic signal to determine one or more properties of the formation, and generating an image of the formation based on the properties.

Statement 13: The system according to Statement 13, further comprising: a caliper for automatically measuring a horizontal distance between the center of the first device and the center of the borehole, and a centralizer for positioning, based on the horizontal distance, the first device so that the center of the first device matches the center of the borehole.

Statement 14: The system according to Statement 12 or 13, wherein processing the electromagnetic signal comprises determining at least one of a gain and a phase of the second device for the electromagnetic signal, and wherein the properties include one or more of a conductivity and a dielectric property of the formation.

Statement 15: The system according to any of Statements 12-14, wherein altering the direction of transmission comprises varying a reactive load of the passive element in the first device to alter an electromagnetic coupling between the active element in the first device and the passive element in the first device.

Statement 16: The system according to any of Statements 12-15, wherein the active element and the passive element in the first device and second device are antennae.

Statement 17: An apparatus, comprising: a first device comprising an active element for transmitting an electromagnetic signal into a borehole formation and at least one passive element for altering a direction of transmission of the electromagnetic signal, and a second device having and active element for receiving the electromagnetic signal and at least one passive element for altering a direction of reception of the electromagnetic signal.

Statement 18: The apparatus according to Statement 17, wherein the active element and the passive element in the first device and second device are antennae, and wherein the active element and the passive element in the first device are embedded in a first dielectric material, and the active element and the passive element in the second device are embedded in a second dielectric material.

Statement 19: The apparatus according to Statement 17 or 18, wherein the direction of transmission and the direction of reception are in phase.

Statement 20: The apparatus according to any of Statements 17-19, wherein the first device and the second device are separated from the formation by a resistive fluid.

What is claimed is:

1. A method, comprising:
    selecting a direction for transmission of an electromagnetic signal, wherein the selection comprises altering an electromagnetic coupling between an active element of a first device and at least one passive element of the first device, wherein the active element and the at least one passive element are antennae;
    selecting one or more operating frequencies of the first device for imaging a borehole formation by radiating the electromagnetic signal into the borehole formation at the one or more operating frequencies based on characteristics of the borehole formation and a resistitivty of a fluid disposed between the first device and the borehole formation;
    radiating, by the active element of the first device, the electromagnetic signal into the borehole formation along the direction at the one or more operating frequencies; and
    receiving, by a second device, the electromagnetic signal.

2. The method of claim 1, further comprising:
    processing the received electromagnetic signal to determine one or more properties of the borehole formation.

3. The method of claim 2, wherein the properties include one or more of a conductivity and a dielectric property of the formation.

4. The method of claim 2, further comprising:
    generating an image of the formation based on the properties of the formation.

5. The method of claim 1, further comprising:
    automatically measuring a horizontal distance between the center of the first device and the center of the borehole; and
    positioning, based on the horizontal distance, the first device so that the center of the first device matches the center of the borehole.

6. The method of claim 5, wherein the horizontal distance is measured by one or more caliper coupled with at least one of the first device and the second device.

7. The method of claim 1, wherein the active element and the at least one passive element are embedded in a dielectric material having a dielectric constant between about 3 and about 150.

8. The method of claim 1, wherein the electromagnetic signal comprises a single frequency or multiple frequencies between about 100 MHz and about 2.5 GHz.

9. The method of claim 1, wherein both the first device and the second device are separated from the formation by the fluid.

10. The method of claim 9, further comprising measuring, by a sensor, the resistivity of the fluid.

11. The method of claim 1, wherein the direction is a direction of maximum gain and altering the electromagnetic coupling comprises varying a reactive load of the at least one passive element.

12. A system, comprising:
a first device comprising an active element for radiating an electromagnetic signal into a borehole formation at one or more operating frequencies and at least one passive element for altering a direction of radiation of the electromagnetic signal at the one or more operating frequencies, wherein the active element and the at least one passive element are antennae, further wherein the one or more operating frequencies of the first device for radiating the electromagnetic signal into the borehole formation are selected based on characteristics of the borehole formation and a resistitivty of a fluid disposed between the first device and the borehole formation;
a second device having an active element for receiving the electromagnetic signal and at least one passive element for altering a direction of reception of the electromagnetic signal;
a processor coupled with the second device for receiving the electromagnetic signal; and
a computer-readable storage medium having stored therein instructions which, when executed by the processor, cause the processor to perform operations comprising:
processing the received electromagnetic signal to determine one or more properties of the formation; and
generating an image of the formation based on the properties.

13. The system of claim 12, further comprising:
a caliper for automatically measuring a horizontal distance between the center of the first device and the center of the borehole; and
a centralizer for positioning, based on the horizontal distance, the first device so that the center of the first device matches the center of the borehole.

14. The system of claim 12, wherein processing the electromagnetic signal comprises determining at least one of a gain and a phase of the second device for the electromagnetic signal, and wherein the properties include one or more of a conductivity and a dielectric property of the formation.

15. The system of claim 12, wherein altering the direction of transmission comprises varying a reactive load of the at least one passive element in the first device to alter an electromagnetic coupling between the active element in the first device and the at least one passive element in the first device.

16. The system of claim 12, wherein the active element and the at least one passive element in the second device are antennae.

17. An apparatus, comprising:
a first device comprising an active element for radiating an electromagnetic signal into a borehole formation at one or more operating frequencies and at least one passive element for altering a direction of radiation of the electromagnetic signal at the one or more operating frequencies, wherein the active element and the at least one passive element are antennae, further wherein the one or more operating frequencies of the first device for radiating the electromagnetic signal into the borehole formation are selected based on characteristics of the borehole formation and a resistitivty of a fluid disposed between the first device and the borehole formation; and
a second device having an active element for receiving the electromagnetic signal and at least one passive element for altering a direction of reception of the electromagnetic signal.

18. The apparatus of claim 17, wherein the active element and the at least one passive element in the first device and second device are antennae, and wherein the active element and the at least one passive element in the first device are embedded in a first dielectric material, and the active element and the at least one passive element in the second device are embedded in a second dielectric material.

19. The apparatus of claim 17, wherein the direction of transmission and the direction of reception are in phase.

20. The apparatus of claim 17, wherein both the first device and the second device are separated from the formation by the fluid.

* * * * *